(12) United States Patent
Hao et al.

(10) Patent No.: US 8,078,502 B2
(45) Date of Patent: Dec. 13, 2011

(54) POPULATING AN E-COMMERCE SHOPPING CART AND OTHER E-COMMERCE FIELDS BASED UPON CONTENT EXTRACTED FROM NATURAL LANGUAGE INPUT

(75) Inventors: Biao Hao, Bedford, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 1173 days.

(21) Appl. No.: 11/670,251

(22) Filed: Feb. 1, 2007

(65) Prior Publication Data

US 2008/0189187 A1     Aug. 7, 2008

(51) Int. Cl.
*G06Q 30/00* (2006.01)
(52) U.S. Cl. .................................................. 705/26.61
(58) Field of Classification Search .................... 705/26, 705/27, 26.61, 26.8
See application file for complete search history.

(56) References Cited

U.S. PATENT DOCUMENTS

| | | | |
|---|---|---|---|
| 6,246,997 B1 | 6/2001 | Cybul et al. | |
| 6,278,996 B1 * | 8/2001 | Richardson et al. | 1/1 |
| 6,510,431 B1 | 1/2003 | Eichstaedt et al. | |
| 7,035,805 B1 * | 4/2006 | Miller | 704/275 |
| 2001/0041980 A1 * | 11/2001 | Howard et al. | 704/270 |
| 2001/0049623 A1 | 12/2001 | Aggarwal et al. | |
| 2005/0005242 A1 * | 1/2005 | Hoyle | 715/745 |
| 2005/0086046 A1 | 4/2005 | Bennett | |
| 2005/0165663 A1 * | 7/2005 | Razumov | 705/27 |
| 2005/0289456 A1 | 12/2005 | Bier | |
| 2006/0190348 A1 * | 8/2006 | Ofer et al. | 705/26 |
| 2008/0034315 A1 * | 2/2008 | Langoulant et al. | 715/780 |
| 2008/0243517 A1 * | 10/2008 | Muschett et al. | 704/275 |

OTHER PUBLICATIONS

Becky Waring, "Startups Face the Gong in 'Who Wants to Be a Billionaire?' / Conference showcases high-tech brainstorms in need of VC angels," San Francisco Chronicle, Jan. 28, 2000, p. B1.*
Shiratori, T., "Intelligent Sales Server for E-Commerce", IBM Research Disclosure, vol. 454, p. 336, Feb. 2002.

* cited by examiner

*Primary Examiner* — Jeffrey A Smith
*Assistant Examiner* — Brandy A Zukanovich
(74) *Attorney, Agent, or Firm* — Patents on Demand, P.A.; Brian K. Buchheit; Scott M. Garrett

(57) ABSTRACT

Shopper free form input representing an unstructured shopping request can be received. The free form input can comprises at least two of a free form voice input, a text message, an email, a fax message, a browser input and an image. The free form input can include information related to one or more items, at least one of a shipping address, and payment details. Semantics can be extracted from the shopper free form input relating to at least one item available for sale. At least one item can be automatically added to an electronic shopping cart based upon the extracted semantics. An ability can be provided to a corresponding shopper to automatically purchase the items contained in the electronic shopping cart.

20 Claims, 4 Drawing Sheets

Shopping Request Message 405

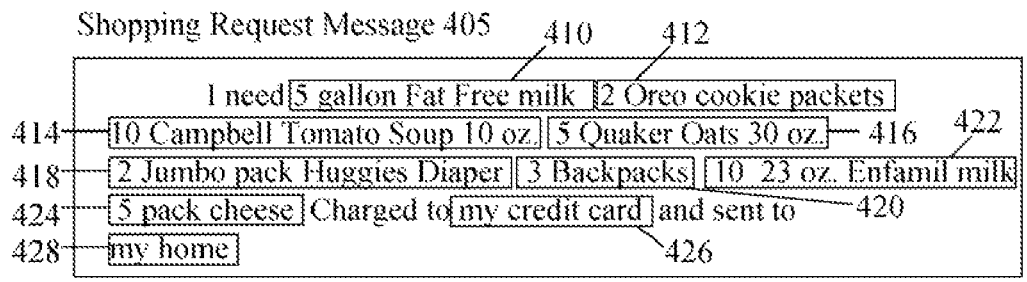

Purchased Items 430

5 Gallons Fat Free milk
2 Oreo Cookies Packet
10 Campbell Tomato Soup 10 oz.
5 Quaker Oats 30 oz.
2 Jumbo Pack Huggies Diaper
3 Backpacks
10 23 oz. Enfamil milk powder
5 pack cheese Shopping Details 432 my credit card -> VISA
my home

Unambiguous Items 440

| Brand | Item | Qty |
|---|---|---|
| Oreo | Cookies - small | 2 |
| Campbell | Tomato Soup 10 oz | 10 |
| Quaker | Oats – 30 oz. | 5 |
| Huggies | Diaper Jumbo | 5 |

Ambiguous Items 442

| Brand | Item | Qty |
|---|---|---|
| | Backpack | 3 |
| | Enfamil | 10 |
| | Cheese | 5 |

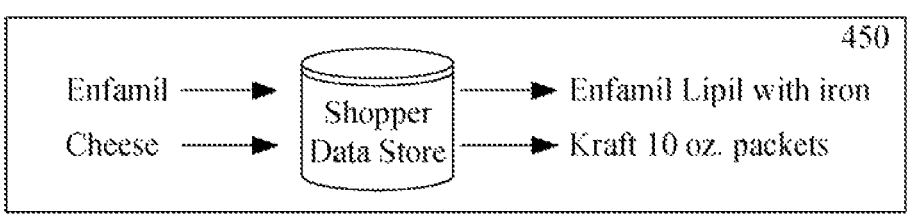

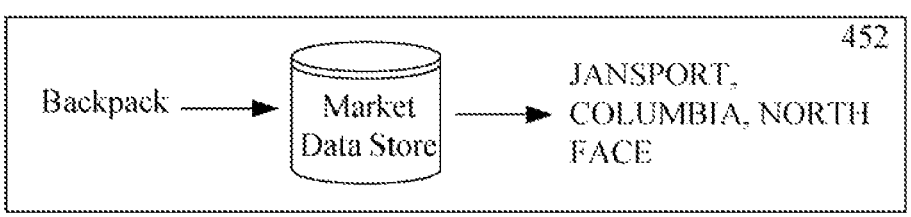

FIG. 4

POPULATING AN E-COMMERCE SHOPPING CART AND OTHER E-COMMERCE FIELDS BASED UPON CONTENT EXTRACTED FROM NATURAL LANGUAGE INPUT

BACKGROUND

1. Field of the Invention

The present invention relates to the field of e-commerce and natural language processing, more particularly, to populating an e-commerce shopping cart and/or other e-commerce fields based upon content contained in natural language input.

2. Description of the Related Art

Electronic commerce or e-commerce relates to the conducting of business communication and transactions over networks and through computers. More specifically, e-commerce includes a buying and selling of goods and services and transferring funds using digital communications and often automated systems. Online shopping is one type of e-commerce transaction, which involves a shopper accessing a Web site linked to a commerce server. Shopper-to-commerce server transactions are not limited to Web based ones but also include telephone based transactions (e.g., Interactive Voice Response transactions), e-commerce transactions, chat based transactions, e-mail based transactions, fax based transactions, and the like.

Conventional e-commerce shopping is conducted as one or more directed transactions between a shopper and an automated system. A shopper typically browses through a catalogue of available items or uses a database search control to search the catalogue based upon shopper provided criteria. A shopper can select items of interest and can add them to an electronic shopping cart. Once shopping is completed, the shopper can opt to proceed to a check-out stage, where payment and shipping details can be provided and the shopping session can be finalized.

When a number of available items in the catalogue are large, shopping for a few items out of many thousands of items can be a very tedious task for shoppers. Often, a user is unable to locate a desired item, even though the commerce source being accessed may include that item. This can be especially true when the commerce source includes an amalgamation of items from many different merchant sources. For example, a shopper can interact with a "gateway" source (e.g., AMAZON.COM, SHOPZILLA.COM, and EBAY-.COM) that links a shopper to multiple item sources.

Current approaches to help direct shoppers use guided shopping techniques, which are based upon customer preferences determined by questionnaire responses, customer purchase history, and other such criteria. Current guided shopping techniques are used to anticipate customer-desired items and are effectively a means for direct marketing or direct advertising.

No known e-commerce technology permits shoppers to conduct shopping transactions using free form input. Further, interactive modalities for automated commerce transactions have been traditionally limited to those modalities (e.g., online shopping via the Web) that lend themselves to catalogue-like interfaces. What is needed is a means to permit customers to conduct e-commerce transactions using free form input, such as natural language input, which is user-friendly interactive means that can be conducted over many different interactive modalities.

SUMMARY OF THE INVENTION

Embodiments of the disclosure detail a method, system, computer program product, and/or apparatus for e-commerce. In the embodiments, shopper free form input representing an unstructured shopping request, can be received. The free form input can comprises at least two of a free form voice input, a text message, an email, a fax message, a browser input and an image, The free form input can include information related to one or more items, at least one of a shipping address, and payment details. Semantics can be extracted from the shopper free form input relating to at least one item available for sale. At least one item can be automatically added to an electronic shopping cart based upon the extracted semantics. An ability can be provided to a corresponding shopper to automatically purchase the items contained in the electronic shopping cart.

Embodiments of the disclosure detail a method, system, computer program product, and/or apparatus for a shopper facing e-commerce interface. In the embodiments, an ecommerce interface can include a natural language input element, a shopping cart, and at least one shopping interactive option. The natural language input element can be one through which a shopper is able to input an unstructured shopping request in a natural language format. The free form input can comprise at least two of a free form voice input, a text message, an email, a fax message, a browser input and an image. The free form input can further comprise information related to one or more items, and at least one of a shipping address, and payment details. The shopping cart can present a set of items specified by the shopper for shopper purchase. The presented items can be determined from the unstructured shopping request provided via the natural language input element. The one or more shopping interactive options can be selected by a user. A selection of the shopping interactive option results in at least one of a change in the items presented in the shopping cart and a finalization of an e-commerce transaction involving a purchase of the items presented in the shopping cart.

BRIEF DESCRIPTION OF THE DRAWINGS

There are shown in the drawings, embodiments which are presently preferred, it being understood, however, that the invention is not limited to the precise arrangements and instrumentalities shown.

FIG. 4 provides an example of free form text processing during an e-commerce transaction.

DETAILED DESCRIPTION OF THE INVENTION

Figure 1:
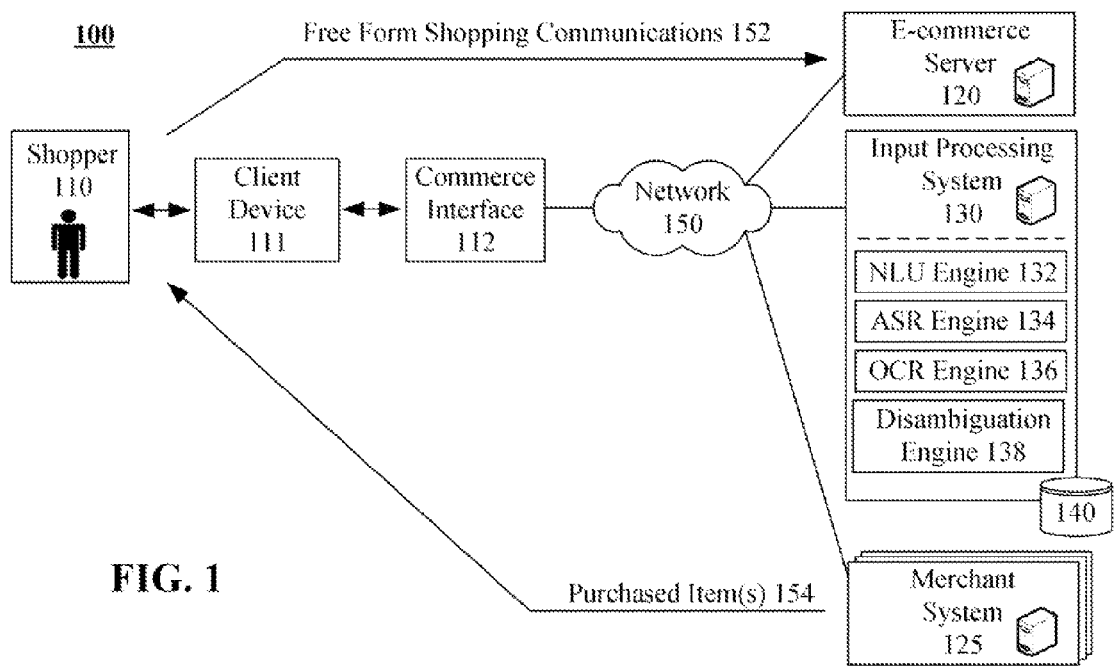
FIG. 1 is a schematic diagram of an e-commerce shopping system that handles free form input, which includes natural language input, in accordance with an embodiment of the inventive arrangements disclosed herein.

FIG. 1 is a schematic diagram of an e-commerce shopping system 100 that handles free form input, which includes natural language input, in accordance with an embodiment of the inventive arrangements disclosed herein. More specifically, a shopper 110 can utilize a client device 111 hosting a commerce interface 112, which is communicatively linked to network 150. An e-commerce server 120, an input processing system 130, and a merchant system 125 can also be communicatively linked to network 150. Shopper 110 can communicate with the e-commerce server 120 within a real-time or a non-real time communication session during which free form shopper provided input 152 can be conveyed to the e-commerce server 120.

E-commerce server 120 can convey the input to input processing system 130, which can extract semantic meaning from the input. For example, speech input can be processed by an automatic speech recognition (ASR) engine 134 and then further processed by a natural language understanding (NLU) engine 132. In another example, text content contained in a graphical image (i.e., from a facsimile message or from an image file message) can be pre-processed by an optical character recognition (OCR) engine 136 before being processed by the NLU engine 132. Extracted semantic meanings can be compared to inventory items available to the shopper 110 for purchase from at least one merchant system 125. Matches can be added to an electronic shopping cart or other commerce artifact provided by the e-commerce server 120. The shopper 110 can modify purchase details and/or confirm a purchase via options provided by the commerce interface 112 (i.e., shopper 110 can opt to modify shopping cart items and/or proceed to check-out). Once an e-commerce transaction has completed, payment can be sent for purchased items if necessary, and purchased items 154 can be shipped to an address designated by shopper 110. In one embodiment, this address can be extracted using input processing system 130 from free form shopping communications 152.

As shown in system 100, shopper 110 can be a human actor that engages in an e-commerce transaction. The commerce interface 112 used by the shopper 110 can vary depending on communication type and based upon a type of device 111 upon which the interface 112 executes. Client hosting device 111 can include any communication device linked to network 150 that is configured to accept shopper input 110, including free form input 152. The device 111 can include, but is not limited to a computer (e.g., a desktop PC, a client-side server, a notebook computer, a tablet computing device, a personal data assistant, a thin client, and the like), a telephone (e.g., line based phone, mobile telephone, and/or Session Initiation Protocol based phone), a fax machine, an e-mail station, a text-exchange device (e.g., an instant messaging, a text messaging, and/or a chat enabling device), a networked scanner, an entertainment gaming device, a media playing device, an embedded computing system, and/or an e-commerce kiosk.

E-commerce server 120 can include any automated or partially automated system used to interact with shopper 110. The e-commerce server 120 can, for example, include a Web server, an Interactive Voice Response (IVR) system, a fax/e-mail processing and routing system, and the like. The e-commerce server 120 can be dedicated to a particular merchant (e.g., an online storefront for the merchant) or can centrally index/manage/handle e-commerce transactions for items provided by multiple different merchants (e.g., AMAZON.COM, EBAY.COM that includes access to EBAY stores and items sold therein, and the like).

In one embodiment, the e-commerce server 120 can be implemented using Service Oriented Architecture (SOA) based techniques. For instance, the server 120 can be part of a component service model system that permits interactions over numerous modalities and can even include in-session modality switching capabilities in which session state information is preserved. Conventional solutions for implementing e-commerce server 120 can include WEBSPHERE COMMERCE SERVER by International Business Machines Corporation (IBM), WEBLOGIC COMMERCE SERVER by BEA Systems, and any of a variety of other commercial solutions.

The input processing system 130 can be any system configured to process free form shopping communications 152 and to extract meaningful e-commerce information, such as customer desired products, shipping addresses, payment details, and the like. In one embodiment, WEBSPHERE components and extensions can be used to implement the various components (132-138) of system 130. Other solutions are available, however, any of which can be utilized for system 100.

The disambiguation engine 138 can utilize data, rules, and/or preferences stored in data store 140 to resolve ambiguities. For example, the data store 140 can include historical shopping information for shopper 110, which can be used to determine a shopper preferred brand and size of an otherwise ambiguous item. A shopper profile 110 can also be stored in data store 140, where customer preferences such as colors, price thresholds, preferred brands, and the like, can be used by engine 138 to resolve ambiguities. One shopper 110 specific data, such as credit card number information, home address, work address, and the like, can be used to translate natural language items (e.g., my home) into a quantified address (e.g., 1600 Pennsylvania Ave. NW, Washington, D.C. 20500) that can be used during e-commerce transaction. Other non-shopper specific preferences, such as most popular brands sold recently, most popular colors for an item, and the like, can be maintained in the data store 140 and used by disambiguation engine 138.

In one embodiment, a confidence value can be established for each semantic unit extracted from free form shopping input 152. These confidence values can be compared against user/administrator configurable thresholds. When the confidence values exceed an upper threshold, the semantic unit can be presumed to be accurate and corresponding e-commerce fields can be automatically filled in. When a confidence value associated for multiple possible interpretations all exceed a lower threshold, a shopper can be prompted to select one of the multiple interpretations and corresponding e-commerce fields can be automatically filled in. When an accurate interpretation for a unit of free form input cannot be determined (a confidence value for a semantic unit falls below a designated threshold) the free form unit can either be ignored or can trigger a prompting operation that prompts the shopper 110 to clarify their intended meaning for the ambiguous unit.

Network 150 can include any hardware/software/and firmware necessary to convey digital content encoded within carrier waves. Digital content can be contained within analog or digital signals and conveyed though data or voice channels. Network 150 can include local components and data pathways necessary for communications to be exchanged among computing device components and between integrated device components and peripheral devices. Network 150 can also include network equipment, such as routers, data lines, hubs, and intermediary servers which together form a data network, such as the Internet. Network 150 can also include circuit-based communication components and mobile communication components, such as telephony switches, modems, cellular communication towers, and the like. Network 150 can include line based and/or wireless communication pathways.

It should be appreciated that enhancement permitting free form shopping communications 152 to be applied to an e-commerce context can be integrated into business systems in a variety of fashions. For example, servers 120 and 130 can be integrated into a single e-commerce hardware/software system, which can follow either proprietary or open standards. In another example, enhanced handling of free form input can be implemented within middleware (e.g., WEBSPHERE APPLICATION SERVER) and remotely accessed via application program interfaces (APIs), linking libraries and/or object classes, remote procedure calls, and the like. Further, the ability to handle free form e-commerce input can be implemented in a Web service, which can be made available to e-retailing customers for a valued consideration, such as a fee.

Figure 2:
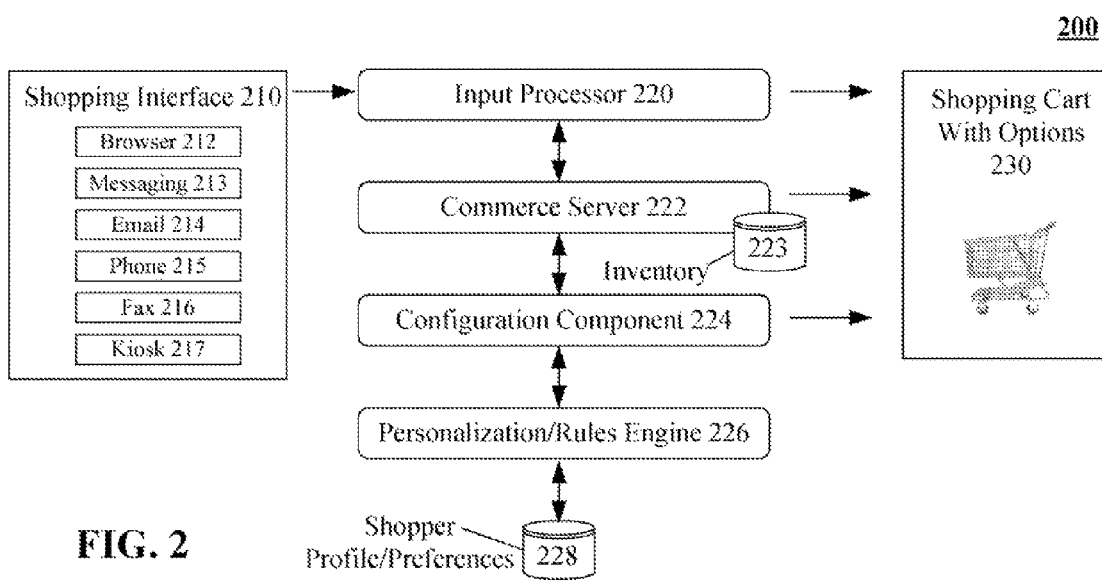
FIG. 2 is a schematic diagram of a system for handling free form input during e-commerce transactions in accordance with an embodiment of the inventive arrangements disclosed herein.

FIG. 2 is a schematic diagram of a system 200 for handling free form input during e-commerce transactions in accordance with an embodiment of the inventive arrangements disclosed herein. System 200 is an alternative representation for system 100 and can utilize components detailed therein in the performance of described functions.

In system 200, a shopper can conduct e-commerce transactions using a shopping interface 210, such as a browser 212, a text messaging interface 213, an e-mail interface 214, a phone interface 215, a fax interface 216, a kiosk interface 217, and the like. Input can include free form input, which the input processor 220 receives. The input processor 220 can extract semantics from the input that relates to at least one item available for sale. Available items can be specified in an inventory data store 223 of an e-commerce server 222.

Whenever an unambiguous match between extracted semantics and inventory items occurs, those items can be automatically placed in a shopping cart 230 along with any discerned quantities and shipping address information. Ambiguities can be resoled and/or accuracy of other entries improved by using shopper specific information maintained within a shopper profile/preferences data store 228. Shopper specific settings can be configured using a configuration component 224, which can be based upon automatically determined shopper data, shopper entered information, and historical e-commerce transaction data. The personalization/rules engine 226 can establish merchant and/or e-commerce server 222 specific rules for applying shopper profile/preference information to e-commerce transactions. Processing results from the configuration components 224 can cause changes to items/data contained within the shopping cart 230.

Once items are contained within the shopping cart 230, the shopper can be provided with a series of options to edit, update, and otherwise modify entries of the shopping cart 230. For example, when an ambiguity exists for a desired item, the shopper can be prompted to select a preferred item from a presented list. In another example, multiple merchant sources (all accessible through the e-commerce server 222) can provide a shopper desired item, and the shopper can select a preferred merchant source. Interactions to edit shopping cart items can include free form input, which is processed by input processor 220. System 200 in its various embodiments contemplates the use of a multimodal interface and/or an interface (for interface 210) that permits both free form and directed interactions.

As presented herein, each of the data stores 223 and 228 (as well as data store 140 of system 100) can be a physical or virtual storage space configured to store digital information. Data stores 140, 223, and 228 can be physically implemented within any type of hardware including, but not limited to, a magnetic disk, an optical disk, a semiconductor memory, a digitally encoded plastic memory, a holographic memory, or any other recording medium. Each of the data stores 140, 223, and 228 can be a stand-alone storage unit as well as a storage unit formed from a plurality of physical devices. Additionally, information can be stored within data store 140, 223, and 228 in a variety of manners. For example, information can be stored within a database structure or can be stored within one or more files of a file storage system, where each file may or may not be indexed for information searching purposes. Further, data stores 140, 223, and/or 228 can utilize one or more encryption mechanisms to protect stored information from unauthorized access.

Figure 3:
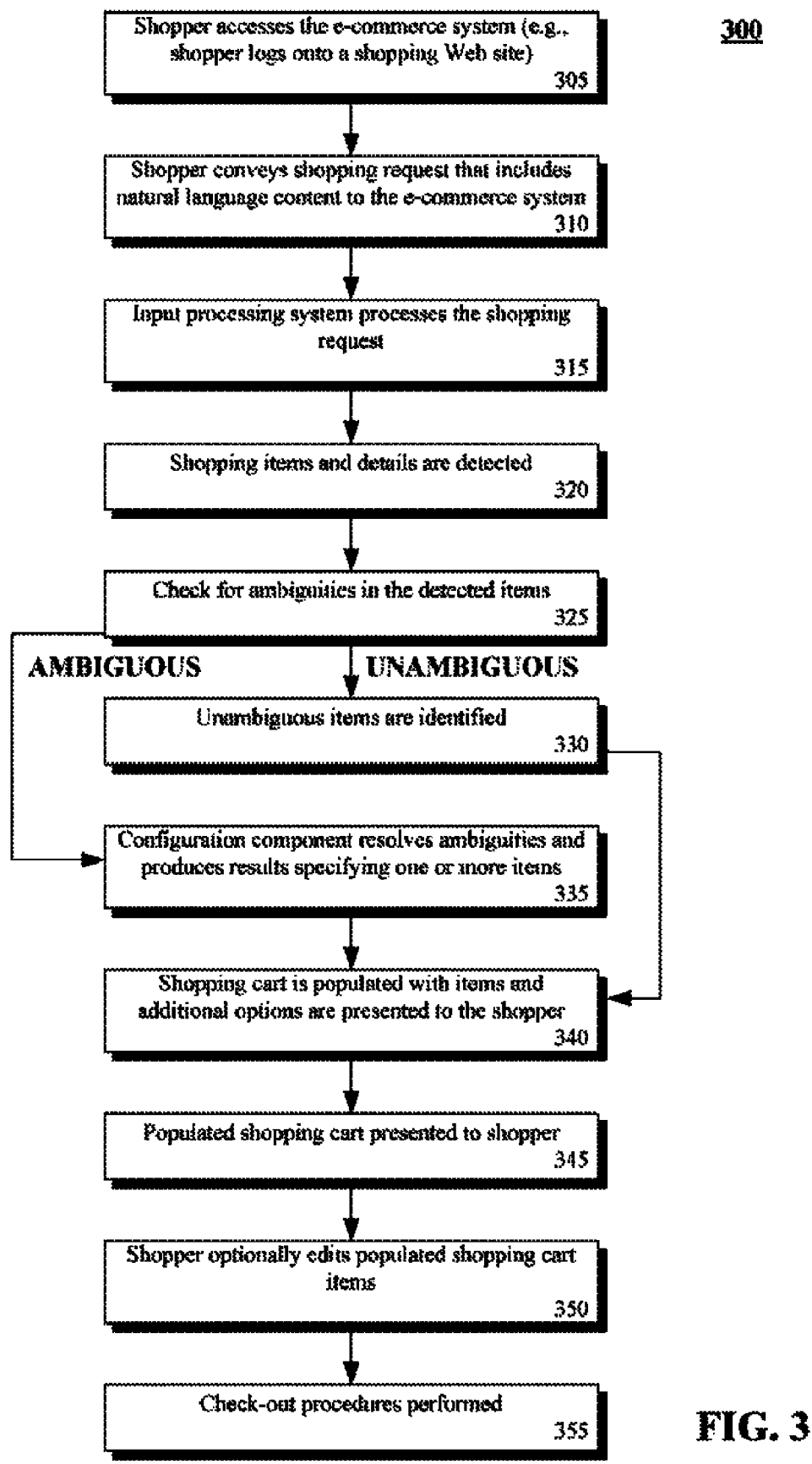
FIG. 3 is a flow chart of a method for conducting e-commerce transactions based in part upon free form user input in accordance with an embodiment of the inventive arrangements disclosed herein.

FIG. 3 is a flow chart of a method 300 for conducting e-commerce transactions based in part upon free form user input in accordance with an embodiment of the inventive arrangements disclosed herein. Method 300 can be performed in the context of system 100, system 200, and/or any similar e-commerce system that includes an input processing component for semantically interpreting free form input.

Method 300 can begin in step 305, when a shopper can access an e-commerce server. For example, a shopper can log onto a Web site provided by the e-commerce server. Method 300 interactions are not limited to Web based ones, however, and other mechanisms for interacting (e.g., accessing an IVR system via a telephone) are contemplated, as elaborated upon in system 100 and 200 respectively. In step 310, the shopper can submit a shopping request in a natural language (or other free form) format to an e-commerce system. The shopping request can be provided using online forms, e-mail, fax, voice over a voice communication channel, mail, chat, and the like.

In step 315, an input processing system can process the shopping request. The input processing system can include speech recognition components, OCR components, text analyzing components, NLU components, and the like, which are selectively used as appropriate for the type of message within which the shopping request is contained. In step 320, one or more shopping items determined from the shopping request can be detected.

A check for ambiguities can be performed in step 325. In step 330, requested items that are unambiguous can be loaded into a shopping cart or other e-commerce artifact, which is associated with a shopper specific e-commerce transaction. In step 335, ambiguous items can be further resolved by a configuration component. If not completely resolved initially, ambiguous items can be narrowed to a manageable set of possible items. Optional further shopper interactions (e.g., selection of a narrowed option set) can then occur. Results of the narrowing process can place new items in the shopping cart.

Accordingly, as shown by step 340, a shopper specific shopping cart can be populated with items ascertained from the shopping request. Additionally, a set of user-selectable options can be narrowed, such as editing options, check-out options, and the like can be associated with the shopping cart. In step 345, the shopper can be presented with the shopping cart and can be permitted to utilize one or more of the shopping cart options. This presentation can occur in real-time, such as when the e-commerce transaction is conducted via a Web site, or over time through a series of exchanged messages, such as when the e-commerce transaction is conducted via e-mail, mail, or fax messages. Notifications, such as fax notifications and/or e-mail notifications, and/or postal mail notifications, can be provided to inform a shopper that their shopping requests have been processed. In one optional embodiment, a real-time interactive modality (e.g., an online Web based modality and/or a telephony based modality) can be requested to finalize an e-commerce transaction, even when original shopping requests are submitted through a non real-time modality (e.g., mail, fax, e-mail, and the like).

In step 350, the shopper can optionally edit populated shopping cart items. In step 355, the shopper can confirm items in the shopping cart and can finalize the e-commerce transaction. For instance, the shopper can opt to check-out.

The user can be prompted to enter any missing check-out information, such as shipping address information, payment information, and the like. It should be noted that some or all of this information can be automatically extracted from previously provided free form input contained within shopping requests, which was processed by an input processing component. Any missing information can also be provided within free form messages, which the input processing component can handle. A purchase order (PO) and other necessary e-commerce transaction artifacts can be automatically generated during the check-out phase of the transaction. The method 300 can be repeated for other e-commerce transactions as desired. Moreover, past transaction history can be stored and used to increase accuracy of future transactions. For example, the configuration component can weigh items that have previously been purchased by a shopper when resolving ambiguities.

FIG. 4 provides an example 400 of free form text processing during an e-commerce transaction. The example 400 can be conducted using a system 100 or 200. Example 400 includes a shopping request message 405 containing content provided in a free form format. Specifically content can include "I need 5 gallon Fat Free milk, 2 OREO cookie packets, 10 CAMPBELL Tomato Soup 10 oz., 5 QUAKER OATS 30 oz., 2 Jumbo pack HUGGIES Diaper, 3 backpacks, 10 23 oz. ENFAMIL milk, 5 packs of cheese. Charged to my credit card and sent to my home."

An input processing component can identify a series of tokens 410-428 that have meaning in an e-commerce context. Different types of tokens, such as purchase item tokens 430 and shopping detail tokens 432, can be used. Purchase item tokens 430 can include information related to a desired item and an item quantity. Detail tokens 432 can include information related to shipping, payment, and the like.

Additionally, different tokens 410-428 can have a different identified scope. For example, tokens 410-424 have a unit scope specific to a corresponding token unit. For example, token 410 of "5 gallon fat free milk" applies to a single purchase item. Tokens 426-428 have a global scope that applies to all of the purchase item tokens 430 in the message 405. For example, token 426 of "my credit card" identifies a payment mechanism for paying for items specified by tokens 410-424. Other scopes not shown by example 400 can also exist. For example, a free form phrase of "milk, OJ, and Juice—5 each" can have quantity (which is a separate token) with a scope that applies to multiple items (each being a separate item specific token).

After tokens 410-428 are generated, categorized, and/or scope determined, a first token processing pass can be performed. In the first pass, tokens can be processed and categorized into unambiguous items 440 and ambiguous items 445, where details of the unambiguous items are clear. For example, a brand, item, and quantity for items associated with tokens 412, 414, 416, and 418 an be clear. Brands and/or other purchase specifics for ambiguous items 445 can be initially unknown.

A second processing phase can resolve ambiguities using purchase history, preference, and profile information of the shopper. As shown by illustration 450, a shopper's profile can specify that ENFAMIL LIPIL with iron is a preferred baby formula. Shopper purchase history can also indicate that cheese refers to KRAFT 10 oz. packets, which resolves ambiguities of token 424.

The second processing phase may leave one or more items unresolved, such as token 420 of three backpacks, which is shown by illustration 452. Brand popularity and general shopper profile information can be used to locate one or more potential candidates for an unresolved item. For example, quality and price thresholds in a shopper profile combined with backpack popularity data (obtained from the purchases of other shoppers) can suggest that backpack refers to "JANSPORT, COLUMBIA, or NORTH FACE" which can be presented to a shopper for shopper selection.

When quantities, brands, colors, merchant source, and other criteria are not provided, these criteria can be automatically inferred from customer preferences, history, merchant specials, popularity, and other such factors. In one embodiment, a user interface can indicate inferred details using a disguisable indicator to focus user attention to facilitate confirmation.

For example, a GUI interface can use different colored fields for entries having an associated accuracy score above a previously set threshold from those entries with a lower accuracy score. Backpack specific items can be presented in a field having a red background, brands for ambiguous items can be presented in fields having a yellow background, and unambiguous items can be presented in fields having a green background. When multiple possible attribute values are determined, a pull down control can be provided to permit a user to quickly adjust field values. For example, a pull down control for backpack can include values of JANSPORT, COLUMBIA, NORTH FACE, and OTHER, where OTHER provides users with different options. Further available options, such as item color and/or merchant, can also be presented within pull-down selectors with defaults established.

It should be appreciated that example 400 is only one possible example illustrating a use of the inventive arrangements disclosed herein. The invention should not be limited to techniques and arrangements expressed herein. Consequently, the example 400 serves as a concrete example to clarify aspects of the invention and is not intended to be construed as a limitation imposed on the inventive scope of the present application. For example, multiple conventional natural language processing technologies currently exist and the invention is not limited to the token identification and processing techniques discussed herein. Similarly, numerous direct marketing and customer preference determination techniques can be used to resolve item ambiguities. Further still, details about a user interface in example 400 focused upon a Web based GUI embodiment and other item prompting, differentiation, and presentation mechanisms are butter suited for other interface types.

Figure 5:
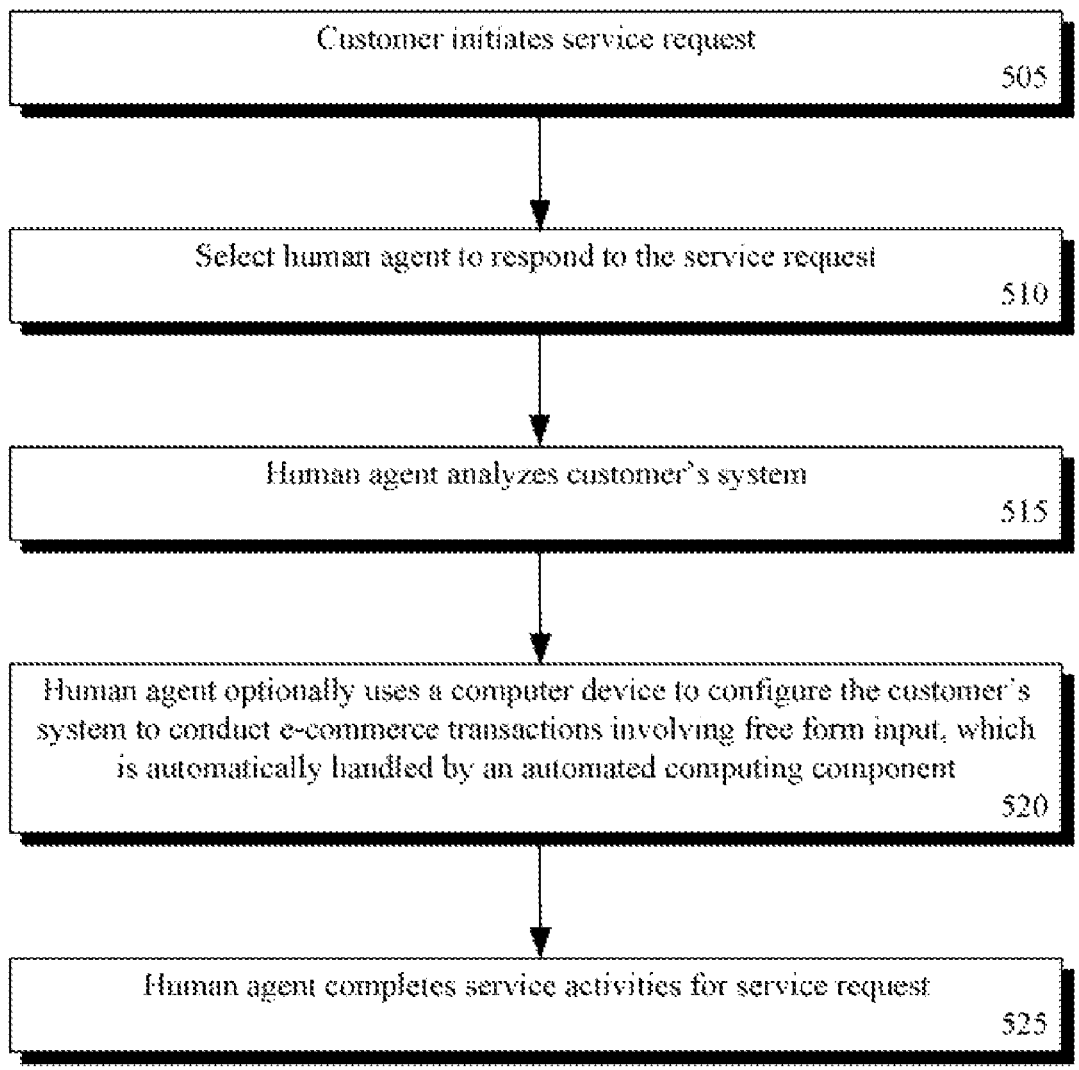
FIG. 5 is a flow chart of a method wherein a service agent can configure an e-commerce system to handle free form shopper input in accordance with an embodiment of the inventive arrangements disclosed herein.

FIG. 5 is a flow chart of a method 500 where a service agent can configure an e-commerce system to handle free form shopper input in accordance with an embodiment of the inventive arrangements disclosed herein. Method 500 can be preformed in the context of systems 100, 200, and/or similar system.

Method 500 can begin in step 505, when a customer initiates a service request. The service request can be a request for a service agent to extend an existing e-commerce system to handle free form input or to establish a new e-commerce system with free form input handling capabilities. The service request can also be a request to troubleshoot a problem with an existing e-commerce system that handles free form input.

In step 510, a human agent can be selected to respond to the service request. In step 515, the human agent can analyze a customer's current system and can develop a solution. In step 520, the human agent can configure the customer's system to conduct e-commerce transactions involving free form input, which is automatically handled by an automated computing component. This can include the installation of a hardware/software and the training of customer personnel in aspects of the e-commerce system. In step 525, the human agent can complete the service activities.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An e-commerce shopping method comprising:
    receiving, via at least one program executing on computer equipment, wherein the at least one program is stored on at least one non-transitory storage medium, shopper free form input representing an unstructured shopping request, wherein the free form input comprises at least two of a free form voice input, a text message, an email, a fax message, a browser input and an image and wherein the free form input further comprises information related to one or more items, at least one of a shipping address, and payment details;
    extracting semantics by a software program executing on computer equipment, wherein the software program is stored on at least one non-transitory storage medium, from the shopper free form input relating to at least one item available for sale;
    automatically adding, via at least one program executing on computer equipment, wherein the at least one program is stored on at least one non-transitory storage medium, at least one item to an electronic shopping cart based upon the extracted semantics; and
    providing, via at least one program executing on computer equipment, wherein the at least one program is stored on at least one non-transitory storage medium, an ability to a corresponding shopper to automatically purchase the items contained in the electronic shopping cart.

2. The method of claim 1, the extracting step further comprising:
    during the extracting step, ascertaining, via at least one program executing on computer equipment, wherein the at least one program is stored on at least one non-transitory storage medium, an ambiguity regarding a plurality of possible items to which a portion of the free form input refers; and
    resolving, via at least one program executing on computer equipment, wherein the at least one program is stored on at least one non-transitory storage medium, the ambiguity in favor of one of the possible items based upon previously stored data contained in a machine readable media relating to the shopper, wherein the previously stored data includes at least one of shopper purchase history data and shopper preference data, wherein the at least one added item includes the favored item of the resolving step.

3. The method of claim 1, further comprising:
    during the extracting step, ascertaining, via at least one program executing on computer equipment, wherein the at least one program is stored on at least one non-transitory storage medium, an ambiguity regarding a plurality of possible items to which a portion of the free form input refers;
    narrowing, via at least one program executing on computer equipment, wherein the at least one program is stored on at least one non-transitory storage medium, possible interpretations for the ambiguity to a set of likely meanings; and
    presenting, via at least one program executing on computer equipment, wherein the at least one program is stored on at least one non-transitory storage medium, a set of shopper selectable options for resolving the ambiguity, wherein said set of options is based on results of the narrowing step.

4. The method of claim 1, wherein the steps of method 1 are performed during a real-time interactive communication session between a shopper and an automated commerce system.

5. The method of claim 4, further comprising:
    presenting, via at least one program executing on computer equipment, wherein the at least one program is stored on at least one non-transitory storage medium, the electronic shopping cart items for shopper confirmation;
    providing, via at least one program executing on computer equipment, wherein the at least one program is stored on at least one non-transitory storage medium, at least one option for the corresponding shopper to edit presented shopping cart item information;
    receiving, via at least one program executing on computer equipment, wherein the at least one program is stored on at least one non-transitory storage medium, a user selected response to check out items in the electronic shopping cart; and
    finalizing, via at least one program executing on computer equipment, wherein the at least one program is stored on at least one non-transitory storage medium, an electronic commerce transaction during check out to finalize the shopper purchase of the check out items.

6. The method of claim 4, wherein the real-time interactive communication session is at least one of an online Web based shopping session, an interactive voice responsive session, and a text-exchange session.

7. The method claim 1, wherein the received free form input is provided within at least one of an e-mail message and a fax message.

8. The method of claim 1, wherein the free form input is in a natural language format, wherein the natural language format refers to a format corresponding to a natural language, which is a language created by human beings for interpersonal communication between a set of human beings, wherein the natural language is distinguished from constructed languages and formal languages.

9. The method of claim 1, wherein the free form input in a natural language format for an English language as spoken between two human beings for human-to-human communications.

10. The method of claim 1, wherein said steps of claim 1 are steps preformed automatically by at least one machine in accordance with at least one computer program having a plurality of code sections that are executable by the at least one machine.

11. The method of claim 1, wherein the steps of claim 1 are performed by at least one of a service agent and a computing device manipulated by the service agent, the steps being performed in response to a service request.

12. A system for conducting electronic commerce comprising:
an e-commerce server configured to receive shopper input, to conduct an e-commerce transaction based upon this input, wherein during the e-commerce transaction a shopper purchases at least one available item;
an input processing system configured to receive free form shopper input comprising at least two of a free form voice input, a text message, an email, a fax message, a browser input, and an image and semantically interpret the free form shopper input into discrete data fields relevant for the e-commerce transaction, wherein the free form shopper input is an unstructured shopping request comprising information related to one or more items, at least one of a shipping address, and payment details; and
a merchandise data store configured to record a set of items available for purchase, wherein at least a portion of the discrete data fields identify shopper desired ones of the set of items.

13. The system of claim 12 further comprising:
a disambiguation engine configured to resolve ambiguities detected by the input processing system when converting content contained in the free form shopper input to information placed in the discrete data fields; and
a shopper data store configured to store and index shopper specific information that includes information relating to shopper preferences and purchase history, wherein the disambiguation engine utilizes data stored in the shopper data store to resolve ambiguities.

14. The system of claim 12, further comprising: a natural language understanding engine configured to convert free form shopper input into data into discrete units of information that are associated with the e-commerce transaction.

15. The system of claim 14, wherein the shopper free form input is contained within shopper provided utterances, said system further comprising: a speech recognition engine configured to convert the shopper provided utterances into text, which is further processed by the natural language understanding engine.

16. The system of claim 14, wherein the shopper free form input is contained within an image file, said system further comprising: an optional character recognition engine configured to extract text from the image file, which is further processed by the natural language understanding engine.

17. A program stored in at least one non-transitory storage medium that when executed by at least one computing device produces a shopper facing e-commerce interface comprises:
a natural language input element through which a shopper is able to input an unstructured shopping request in a natural language format, wherein the free form input comprises at least two of a free form voice input, a text message, an email, a fax message, a browser input and an image and wherein the free form input further comprises information related to one or more items, at least one of a shipping address, and payment details;
a shopping cart configured to present a plurality of items specified by the shopper for shopper purchase, wherein the presented items are determined from the unstructured shopping request provided via the natural language input element; and
at least one shopping interactive option configured to be selected by a user, wherein a selection of the shopping interactive option results in at least one of a change in the items presented in the shopping cart and a finalization of an e-commerce transaction involving a purchase of the items presented in the shopping cart.

18. The program stored in at least one non-transitory storage medium of claim 17, said e-commerce interface further comprising: a shopper profile editing interface configured to permit a shopper to configure item purchasing preferences, which are used by a natural language processing system to resolve ambiguities detected in the input when the natural language processing system semantically interprets the unstructured shopping request into discrete data elements specific to at least one of the presented items.

19. The program stored in at least one non-transitory storage medium of claim 17, wherein said e-commerce interface is a Web based interface accessible via a browser having a graphical user interface (GUI), wherein the natural language input element, the shopping interactive option, and the shopping cart are represented by GUI elements.

20. The program stored in at least one non-transitory storage medium of claim 17, wherein said e-commerce interface is a voice only interface for interacting with an automated voice response system over a real-time communication channel.

* * * * *